Dec. 11, 1928.
E. O. WEIR
1,694,957
SERVING DISH
Filed May 5, 1926
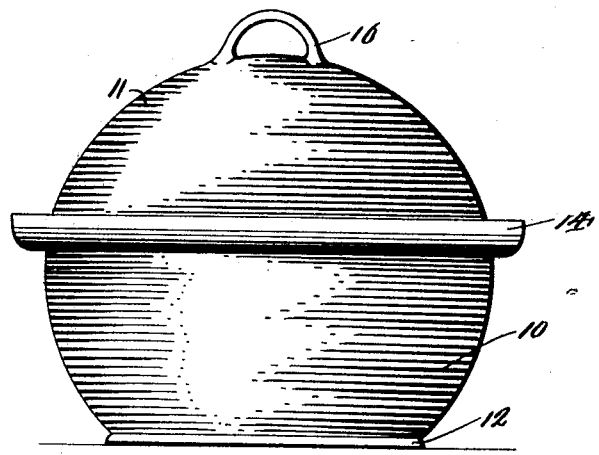
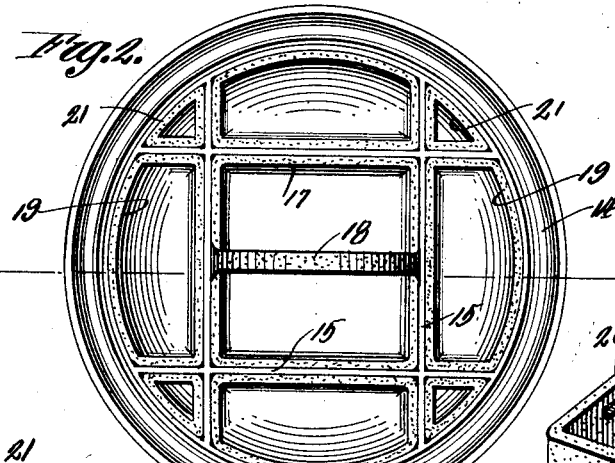
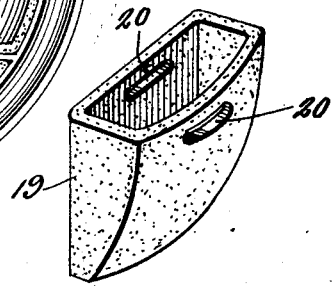
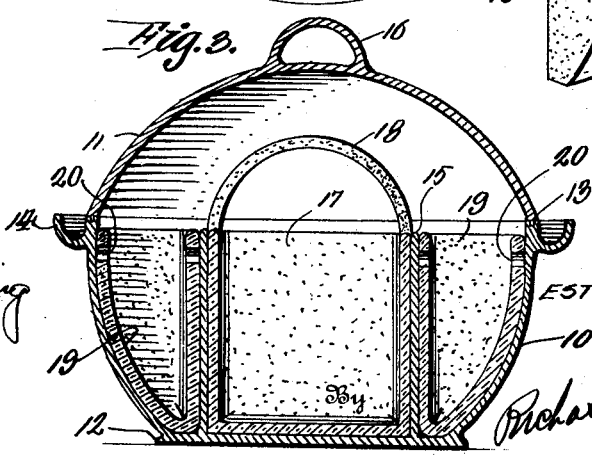
WITNESSES
Inventor
ESTA OMA WEIR
Attorney Patented Dec. 11, 1928.

1,694,957

UNITED STATES PATENT OFFICE.

ESTA OMA WEIR, OF CHICAGO, ILLINOIS.

SERVING DISH.

Application filed May 5, 1926. Serial No. 106,932.

The present invention relates to improvements in dishes and has for its primary object to provide a dish designed to permit serving of a plurality of different commodities from the same dish without any likelihood of mixing of the commodities.

A further object of the invention is the provision of a serving dish of the above character which is formed so as to permit tight closure of the same so as to maintain the food in heated condition for a substantial time and prevent the accumulation of foreign matter on the food therein.

Still another object of the invention is the provision of a serving dish devised to contain food stuffs of different varieties having removable receptacles to facilitate the cleaning thereof.

Another object of the invention is the provision of a dish of the above type which is simple and durable of construction and which can be manufactured at a relatively low cost.

Other objects and advantages of the invention will become apparent as the description progresses.

In the accompanying drawing forming a part of this specification and in which like reference characters are employed to designate corresponding parts throughout the same:

Figure 1 is a side elevational view of the assembled dish;

Figure 2 is a top plan view of the body of the dish, showing the cover removed;

Figure 3 is a vertical transverse sectional view taken on the line 3—3 of Figure 2 with the cover in place;

Figure 4 is a perspective view of one of the side containers; and

Figure 5 is a perspective view of one of the corner containers.

Referring to the drawing, wherein for the purpose of illustration is shown the preferred embodiment of my invention, it will be noted that my improved dish comprises a body designed to accommodate a plurality of containers arranged to conveniently carry commodities of different varieties. In the embodiment shown, the device comprises a body 10 and a cover 11.

The body is of generally hemi-spherical formation arranged so that its open end will be disposed upwardly while the lower end is flattened and provided with an annular outwardly projecting base flange 12, formed to firmly support the container in upright position. The upper edge of the body section 10 is preferably of increased thickness to permit the formation of an annular groove 13 therein. Formed about the upper edge of the body section 10 and extending outwardly therefrom is a continuous concave rim 14.

Formed within the body 10 and disposed vertically therein are a plurality of rightangular intersecting partitions 15, in the present instance positioned so as to divide the interior of the body 10 into a comparatively large rectangular central compartment, longitudinal side compartments and triangular formed corner compartments. The upper edges of the partitions 15 extend in a horizontal plane with the upper side edges of the dish as shown to advantage in Figure 3.

The container embodies a substantially hemi-spherical cover 11 having its edge disposed downwardly and formed with a flange 13' for engagement in the groove 13 formed in the upper edge of the body. This cover is provided at its upper portion with a handle 16 formed integral with or secured to the cover and arranged to facilitate the placing or removal of the cover onto or from the body.

It is readily apparent, from the foregoing description, that a novel form of serving dish has been produced, having the body thereof divided into several compartments wherein may be disposed different varieties of food stuffs and condiments. While the device is susceptible of convenient use in this form, I contemplate the provision of a plurality of containers formed so as to be readily disposed within and removed from the compartments formed in the body. This is effected in the present embodiment by the provision of a comparatively large rectangular container 17 adapted to be slidably fitted in the center compartment of the body and having an arched handle 18 connecting with opposed sides of the receptacle to facilitate the handling thereof. In a similar manner, oblong containers 19 are disposed within the side compartments and arranged for convenient removal by the formation of longitudinal slots 20 in the sides thereof, adapting the said containers to be conveniently grasped. The corner compartments receive substantially triangular-shaped tapered containers 21 provided in their outer curved walls with slots 22, these containers being particularly adaptable for containing condiments and the like. Thus, it will be seen, that each compartment is provided with a container conforming to the general contour of the respective compartment and arranged for removable disposition therein.

From the foregoing it will be noted that a compact and highly desirable form of dish has been devised, fulfilling the requirements for a serving dish which will maintain the food in several distinct containers and in a suitably heated condition for serving. In the construction of the dish, it is considered advantageous to form the body and cover of silver or other suitable metal, including the partitions, and the removable containers of porcelain. Of course, various materials may be employed in the construction of the dish so that the entire structure may be metallic or porcelain or other desired material. Food stuffs of various kinds may be deposited in the central and side containers while the small, corner containers are used for salt, pepper and spices. In this manner, the food for an entire meal may be placed on the table in a single dish and the various commodities readily served from the containers therein. It is to be understood that the form of my invention herewith shown and described is to be taken as the preferred example of the same, and that various changes as to the shape, size and arrangement of parts may be resorted to without departing from the spirit of the invention or the scope of the subjoined claims.

Having thus described my invention, I claim:—

1. A serving dish comprising a body, a plurality of intersecting partition walls within the body dividing the interior thereof into a central, relatively large compartment, other compartments at the opposite sides of the first mentioned compartment, and other relatively small compartments in the corners between the relatively adjacent ends of the second mentioned compartments, a container removably disposed in each of the several compartments, and a cover for the said body.

2. A serving dish comprising a body of approximately semi-spherical contour, a cover for the body of corresponding contour, a plurality of pairs of intersecting partition walls within the body dividing the interior thereof into a central, relatively large compartment, other compartments at the four sides of the central compartment, and other relatively small compartments in the corners between the relatively adjacent ends of the second mentioned compartments, a container removably disposed in each of the several compartments, and a handle arched form spanning the container within the central compartment and receivable within the cover, the opposite walls of the containers in the second mentioned compartments having slots formed therein whereby the said containers may be grasped and removed.

In testimony whereof I affix my signature.

ESTA OMA WEIR.